United States Patent [19]

Provencher

[11] Patent Number: 4,955,973
[45] Date of Patent: Sep. 11, 1990

[54] CONVERTIBLE BENCH SEAT FOR VANS

[76] Inventor: Roland L. Provencher, 4406 SW. 66th Terr., Davie, Fla. 33314

[21] Appl. No.: 340,897

[22] Filed: Apr. 20, 1989

[51] Int. Cl.⁵ .............................. B60N 2/14; B60N 2/30
[52] U.S. Cl. .................................. 296/65.1; 248/425; 297/43; 297/335
[58] Field of Search ................... 296/65.1; 297/14, 43, 297/232, 255, 257, 331–332, 335, 349; 248/425

[56] References Cited

U.S. PATENT DOCUMENTS

| | | | |
|---|---|---|---|
| 1,049,338 | 1/1913 | Butterworth | 297/43 |
| 1,354,137 | 9/1920 | Shanaman | 297/257 |
| 2,396,039 | 3/1946 | Burton et al. | 244/118.1 |
| 2,495,520 | 1/1950 | Grimm | 296/65.1 |
| 2,523,960 | 9/1950 | Liljengren et al. | 297/43 |
| 2,674,300 | 4/1954 | Liljengren et al. | 297/43 X |
| 2,702,071 | 2/1955 | Liljengren | 297/43 |
| 4,740,030 | 4/1988 | Nordskog | 297/14 X |

*Primary Examiner*—Dennis H. Pedder
*Attorney, Agent, or Firm*—Robert M. Schwartz; Edward I. Mates

[57] ABSTRACT

A convertible bench seat or bed for vans and other vehicles constructed and arranged to be readily mounted between a storage position and an operative position without displacing the bench seat. The bench seat of this invention is pivoted about a first vertical axis and comprises a seat portion pivoted relative to a back portion of the seat. Means are provided for securing the convertible bench seat in its seat storage position without requiring a great deal of time-consuming labor. Similarly, a minimum amount of labor is required to lock the seat in its operative position in sufficiently spaced relation behind permanent front seats of the vehicle.

13 Claims, 3 Drawing Sheets

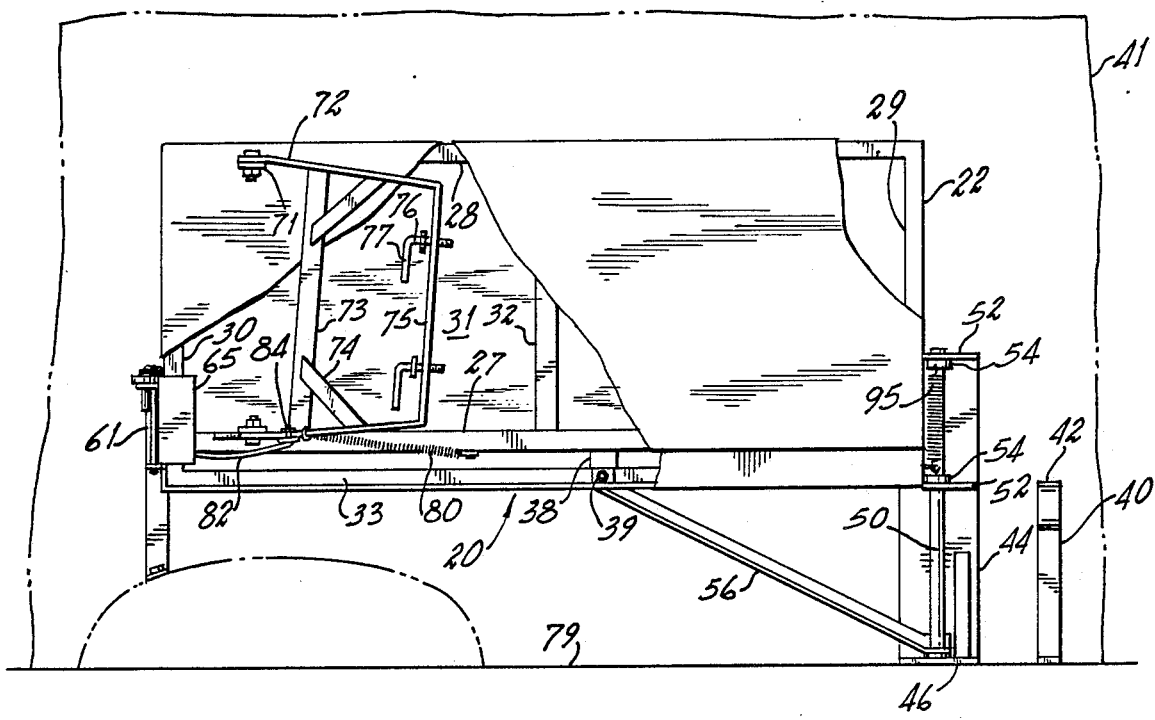
FIG - 1 -
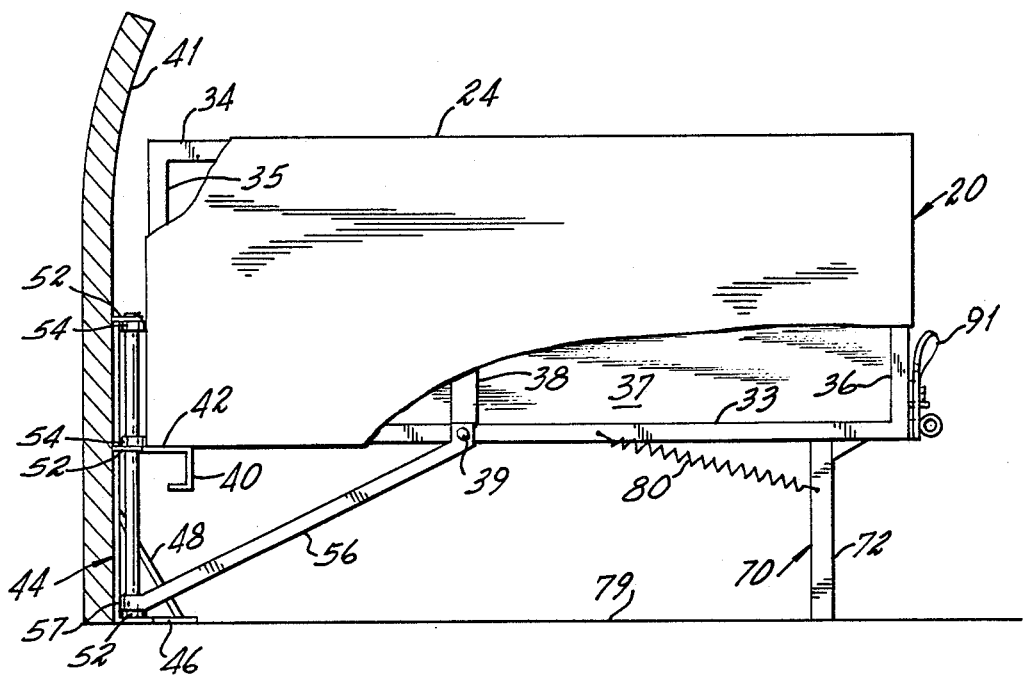
FIG - 5 -

CONVERTIBLE BENCH SEAT FOR VANS

FIELD OF INVENTION

This invention relates to convertible bench seats or beds for vehicles such as vans that are used to haul passengers and/or freight.

BACKGROUND OF INVENTION

In vehicles used for transporting passengers and/or cargo, such as vans, it is desirable to be able to rearrange the storage space of the vehicle to provide a greater number of seats for passengers when transporting a relatively small cargo and also provide for more cargo space when a smaller passenger load permits an increase of cargo space. The problem of converting passenger space to cargo space and vice versa has been faced in the past, but the solutions left something to be desired, mainly because of the awkwardness of converting prior art storage and seating apparatus, as will be discussed in detail in the following discussion of prior art patents called to the attention of the inventor as a result of a patent search.

PATENTS OF INTEREST

U.S. Pat. No. 2,396,039 to Burton et al., issued Mar. 5, 1946, discloses a system for storing folding aircraft seats in nested arrangement against the side walls of an aircraft when the aircraft is converted from passenger to cargo use. It is necessary in this patent to remove the seats from the positions they occupy for passenger seating when the seats are stored to provide storage space for cargo. Hence, converting at least a portion of available cargo space from passenger to cargo use is time-consuming, as is the reverse procedure of relocating the passenger seats for use by passengers, if one follows the teaching of this patent.

U.S. Pat. No. 2,820,507 to Provencher, issued Jan. 21, 1958, shows a foldable reclining chair convertible into a flat bed and vice versa. There is no teaching in this patent of folding the chair and storing the chair in such a manner as to increase cargo space when the chair is not used either as a bed or a chair.

U.S. Pat. No. 3,171,684 to Carte, issued Mar. 2, 1965, discloses another prior art construction of a foldable seat convertible into a flat bed or settee.

U.S. Pat. No. 3,762,764 to McJunkin, issued Oct. 2, 1973, shows a folding seat for transportation vehicles having an upright back portion having a recess at its lower portion and a pivotable seat portion pivotable between an upright folded position housed in the recess and a lowered, full seating position extending outward from the recess of the upright back portion. Folding the seat portion upright provides storage space only for small articles whose size does not exceed the space equal to an aisle between adjacent seats.

U.S. Pat. No. 4,110,855 to Acker, issued Sept. 5, 1978, shows a convertible sofa bed unit comprising a back section 14 movable between a substantially vertical position along the rear of a seat section 12 when the unit is used as a sofa and a horizontal position along the forward edge of the seat section when the unit is used as a bed.

A study of the patents just reviewed indicates the lack of an easily operable conversion feature for converting a passenger portion containing one or more passenger receiving seats into a cargo holding space. The prior art fails to provide a simple seat moving means for moving one or more seats into a location providing a large cargo area and permitting a return movement to the seating arrangement when it is more important to carry passengers than cargo, as evidenced by the previously discussed patents called to the attention of the inventor based on the results of said patent search.

SUMMARY OF THIS INVENTION

This invention provides a foldable bench seat or bed for a vehicle having an essentially vertical wall and an essentially horizontal floor. The seat or bed is constructed and arranged for pivoting about a vertical axis adjacent the vehicle wall between a folded storage position against said wall of the vehicle and an unfolded operative position spaced from the wall. Hereafter in this specification, the terms "seat" and "bench" are not limiting and also may be interpreted to include a bed.

The foldable seat comprises a back portion and a seat portion. The seat portion is pivotably connected to the back portion about an essentially horizontal axis for movement between a seat portion storage position against the back portion and a seat portion operative position extending in an unfolded relation from the back portion. A first vertical pivot rod is supported adjacent the essentially vertical wall of the vehicle for pivotably supporting one longitudinal end portion (such as the outer forward end portion) of the foldable seat for moving the foldable seat about the first vertical axis formed by the first vertical pivot rod.

A second vertical pivot rod is supported by the essentially vertical wall in spaced relation to the first vertical pivot rod. A locking mechanism is pivoted to the second vertical pivot rod to lock the longitudinal end portion of the seat opposite the one longitudinal end portion of the foldable seat against the wall.

The locking mechanism comprises a first cooperative L-shaped locking member having an outer longitudinal end portion pivotably mounted to the second vertical pivot rod and a slotted portion, a second cooperative locking member preferably an eye bolt fixed to the opposite longitudinal end portion of the foldable seat and constructed and arranged for alignment with the slotted portion of the first cooperative locking member when the foldable seat occupies its seat storage position and the seat portion occupies its seat portion storage position, and a third cooperative locking member, preferably a locking pin constructed and arranged to secure the second cooperative locking member to the first cooperative locking member by passing through the eye of the eye bolt when the first and second cooperative members are aligned. The locking pin is preferably tethered to prevent its sliding through the eye of the eye bolt.

The foldable seat also includes a pivotable support frame pivotably supported at one end thereof adjacent to the longitudinal end portion of the foldable seat opposite said one longitudinal end portion. Means is operatively connected between the pivotable support frame and the seat portion and is constructed and arranged to lower the pivotable support frame to engage the floor of the vehicle when the seat portion moves to its unfolded seat portion operative position and to lift the pivotable support frame into engagement with the seat portion when the latter moves into its folded seat portion storage position.

Optionally, frame connecting means is provided to engage the pivotable support frame to the floor of the vehicle when the pivotable support frame engages the floor to selectively secure the pivotable support frame to the floor when the foldable seat occupies its unfolded operative position and the seat portion occupies its seat portion operative position unfolded from the back portion. Other optional elements that may be incorporated in the foldable bench seat of this invention are a cooperating lock pin and an angular member of flexible material, such as spring steel, provided with two apertures. The lock pin engages one of the apertures to lock the seat portion in the seat portion locked position and engages the other aperture to lock the seat portion in the seat portion operative position. The present invention may also have a storage shelf located in position to support the seat portion in its unfolded position when the seat occupies its seat operative position.

In a preferred embodiment of the invention, the essentially vertical wall, adjacent which the first vertical pivot rod and the second vertical pivot rod are supported in spaced relation therealong, is one longitudinal side wall of the vehicle. Such a vehicle has a front driver seat and a front passenger seat rigidly mounted to the floor of the vehicle and the first vertical pivot rod is supported adjacent the essentially vertical wall of the vehicle at such a longitudinal spacing to the rear of the front seats that there is sufficient clearance behind the front seat for one or more occupants to sit on the seat portion of the foldable seat when the foldable seat occupies its operative position and the seat portion occupies its seat portion operative position unfolded from the back portion of the foldable seat.

For larger vans, each of the longitudinal side walls may have a foldable bench seat that is the mirror image of the foldable bench seat supported in the cantilever arrangement already described for one foldable bench seat.

In another embodiment of this invention, the essentially vertical wall to which the first and second vertical pivot rods are attached is located adjacent a plane intersecting the rear surface of a pair of front seats of the vehicle, with the essentially vertical wall preferably being the rear wall of at least one of the front seats and the foldable seat is pivotable about the first vertical pivot rod which forms a vertical axis attached to one of the front seats and the second vertical pivot rod is adjacent to the other of the front seats so that the foldable seat is capable of being stored immediately behind one or both of the front seats in its storage position and is moved or pivoted to an operative position between the two front seats of the vehicle when the pivotable bench seat pivots to its operative seat position.

In the first embodiments of this invention, the foldable seat(s) is (are) in the form of a bench (or benches) that is (are) stored in direct engagement against one (both) side wall(s) of the vehicle and assumes its (their) operative position(s) in spaced relation to the rear of the front seat or front seats at such a distance therebehind that there is sufficient clearance behind the front seat for one or more occupants to sit on the seat portion of the foldable seat(s) when the foldable seat(s) occupies (occupy) its (their) operative seat position(s) and the seat portion(s) occupies (occupy) its (their) seat portion(s) operative position(s) unfolded from the back portion(s).

Details of the various elements forming the structure of the foldable seat of this invention will be described in further detail in a description of preferred embodiments of this invention that follows.

BRIEF DESCRIPTION OF THE DRAWINGS

In the drawings that form a part of a description of illustrative embodiments of this invention, like reference numbers are applied to like structural elements. In the various figures comprising a set of drawings illustrating this invention, FIG. 1 is a frontal elevational view of a foldable convertible bench seat in its folded configuration, shown supported in position for storage against the side wall of a vehicle such as a van.

FIG. 5 is a rear elevational view of the convertible bench seat when its seat portion occupies an unfolded open position locking toward the rear of said unfolded convertible bench seat with the bench seat pivoted into its operative seat position to serve as a seat and its seat portion unfolded away from its back portion.

BRIEF DESCRIPTION OF PREFERRED EMBODIMENT AND VARIATIONS THEREOF

Figure 2:
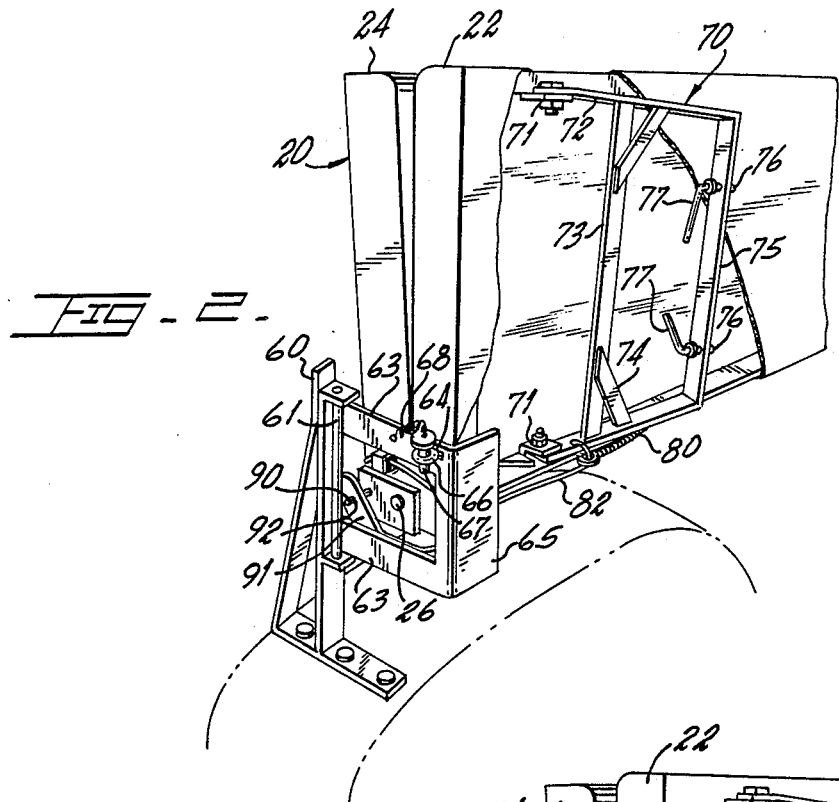
FIG. 2 is a perspective view looking at one end of the seat of FIG. 1, showing an end lock means locking the rear end of a locked seat in the locked position depicted in FIG. 1.

Referring to the drawings, a convertible bench 20 conforming to the structure taught by this invention comprises a seat portion 22 and a back portion 24. A first pivot hinge 25 (FIG. 7) at one longitudinal end called the forward or outer end of the convertible bench 20 and a second pivot hinge 26 (FIGS. 2, 3 and 6) at the opposite longitudinal end of said bench form a horizontal axis for pivoting the seat portion 22 relative to back portion 24 between a seat portion storage position depicted in FIGS. 1, 2 and 3, and a seat portion operative position unfolded from back portion 24 depicted in FIGS. 6 and 7.

Seat portion 22 is reinforced by a reinforcing frame that comprises a first longitudinal frame member 27 that extends along the lower longitudinal portion of seat portion 22, a second longitudinal frame member 28 that extends along the upper longitudinal portion of the reinforcing frame, a first end frame member 29 that extends transversely of seat portion 22 at the one longitudinal end or front end of convertible bench seat 20 when the latter is in its stored position and a second end frame member 30 that interconnects the first longitudinal frame member 27 and second longitudinal frame member 28 at the opposite longitudinal end or rear end of seat 20. Seat portion 22 also contains a plywood support 31 and a cross brace 32 that interconnects the longitudinal center portions of first longitudinal frame member 27 and second longitudinal frame member 28.

Back portion 24 (FIG. 5) is reinforced with a frame comprising a first longitudinal frame member 33, a second longitudinal frame member 34, a first end frame member 35 and a second end frame member 36 arranged in the form of a rectangle. A plywood support 37 interconnects the frame members and a cross brace 38 is provided for back portion 24 between the first longitudinal frame member 33 and second longitudinal frame member 34. A bracket 39 connects cross brace 38 with first longitudinal frame member 33.

A first forward support bracket 40 (FIG. 1) is mounted on the van side wall 41. First bracket 40 comprises a horizontal support ledge 42 that extends horizontally from bracket 40 along a horizontal plane in the position to underlie and support first end frame member 29 of seat portion 22 when convertible bench seat 20 is pivoted into a seat operative position extending away from van side wall 41.

An L-shaped bracket 44, having a floor engaging member 46 and a diagonal bracing member 48, is attached to side wall 41 and is used to support a first vertical post 50 in spaced relation to but adjacent to side wall 41. To accomplish this purpose, several ears 52 interconnect L-shaped bracket 44 to first vertical post 50. Additional ears 54 are connected at one end to first end frame member 35 of back portion 24 and have another end rotatably supported around first vertical post 50. A diagonal brace 56 interconnects bracket 39 to a lower ear 57. The latter is pivotably mounted to first vertical post 50 at the bottom of diagonal brace 56. Ears 52 are rigidly fixed to vertical van side wall 41 and align post 50 for axial vertical movement so that post 50 is capable of supporting convertible bench 20 for pivoting around the vertical axis formed by first vertical post 50.

Figure 3:
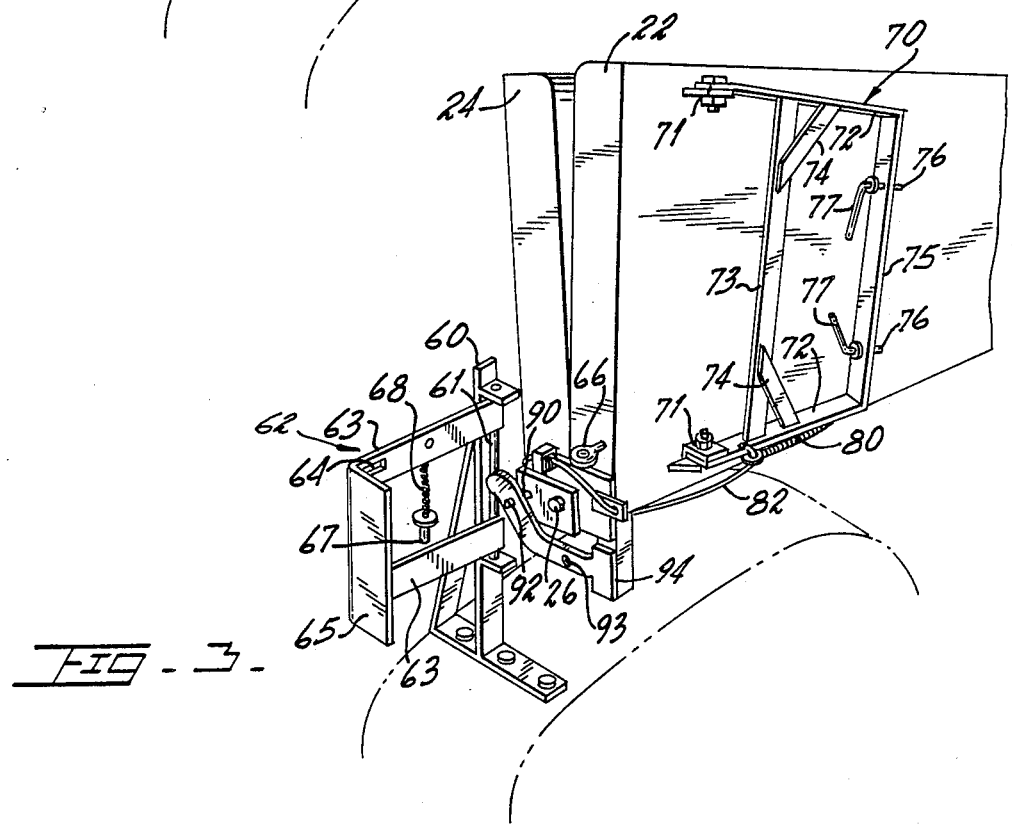
FIG. 3 is a perspective end view of the seat similar to that of FIG. 2, showing the seat and said end lock means unlocked from the end of the seat but with the seat still folded in the folded configuration the folded seat occupies when engaged and supported against the side wall of the vehicle.

Referring particularly to FIGS. 2 and 3, mechanism for locking convertible bench seat 20 against side wall 41 is disclosed. This latter mechanism comprises an end lock support bracket 60 which supports a second vertical pivot rod 61 in closely spaced relation to side wall 41. The end locking mechanism comprises a first cooperative locking member 62 comprising an outer end portion consisting essentially of a pair of upper and lower horizontal legs 63. One of the horizontal legs 63 is provided with a slot portion 64. FIGS. 2 and 3 show the slot portion 64 in the upper leg 63. The end locking mechanism of FIGS. 2 and 3 comprises an end flange 65 of the first cooperative locking member 62. The end locking mechanism also comprises an eye bolt 66 which serves as a second cooperative locking member of the end locking mechanism. Eye bolt 66 is rigidly secured to any convenient portion of seat portion 22, preferably its second end frame member 30. A locking pin 67 serves as a third cooperative locking member of the end locking mechanism and its purpose will be described later. End locking member 62 is pivotably connected to second vertical pivot rod 61 between an end locking position depicted in FIG. 2, wherein horizontal legs 63 cooperative with end flange 65 to form a corner that engages the rear lower corner of folded convertible bench 20 when the latter is in its seat storage position. At this time, eye bolt 66 extends through slot portion 64 of one of the horizontal legs 63 and the locking pin 67 is inserted through the eye of eye bolt 66 to secure end locking member 62 in position to lock convertible bench seat 20 in the seat storage position depicted in FIG. 2. A tether in the form of a chain 68 attaches locking pin 67 to one of the horizontal legs 63 to prevent sliding of locking pin 67 through the eye of eye bolt 66.

When locking pin 67 is displaced from the eye of eye bolt 66, first cooperation locking member 62 of the end locking mechanism is free to pivot into the position depicted in FIG. 3. This movement enables the convertible bench seat 20 to be pivoted from the seat storage position depicted in FIGS. 1 and 2 to the seat operative position depicted in FIGS. 5 to 7.

The apparatus of this invention also comprises a pivotable support frame 70 mounted on hinges 71 for pivoting relative to seat portion 22. Frame 70 comprises a pair of longitudinally converging legs 72 interconnected by a cross brace 73 and further reinforced by oblique reinforcements 74 between legs 72 and cross brace 73. An apertured base member 75 extends between and interconnects the free ends of longitudinally converging legs 72. A pair of L-shaped externally threaded rods 76, each provided with a handle 77 to rotate the rods 76, is received in each of a pair of apertures 78 in base member 75. Thus, externally threaded rods 76 serve as frame connecting means to connect the pivotably support frame 70 to the floor 79 of the vehicle in which the convertible bench seat 20 is mounted.

The apparatus of this invention also comprises a spring 80 operatively connected between pivotable support frame 70 and seat portion 22. While the connections may be at any convenient locations, one of the longitudinally converging legs 72 of frame 70 has been found suitable for connecting one end of spring 80 and first longitudinal frame member 27 of seat portion 22 has been found to be suitable for connecting the opposite end of spring 80. The apparatus also includes a flexible cable 82 having an enlarged end 84 fixed to frame 70, preferably at one of the longitudinally converging legs 72. Cable 82 extends through an aperture in an apertured plate 86, which is supported on a pulley support plate 87 which is rigidly fixed to an end of seat portion 22. Cable 82 continues over and around a pulley 88 carried by pulley support plate 87. A hinging plate 89 is fixed to an end portion of back portion 24 using the other enlarged end portion of cable 82. Pulley support plate 87 is pivotably supported relative to plate 89 by second pivot hinge 26.

A threaded lock pin 90 extends through plate 89 and is axially adjustable in position using lock nuts that engage lock pin 90 on opposite sides of plate 89. The outer longitudinal extremity of lock pin 90 extends rearward from its associated plate 89 to slidably engage an angular member 91 of flexible material such as spring steel. The angular member 91 is provided with apertures 92 and 93 and an enlarged end portion 94. The enlarged end portion 94 is secured to pulley support plate 87 so that the enlarged end portion 94 rotates in unison with pulley support plate 87, apertured plate 86 and seat portion 22.

When lock pin 91 engages aperture 92, it locks seat portion 22 in a seat portion storage position depicted in FIGS. 1 and 2. When angular member 91 is flexed outward to disengage aperture 92 from threaded lock pin 90, seat portion 22 is free to pivot relative to back portion 24 about an essentially horizontal pivot axis defined by pivot hinges 25 and 26. When seat portion 22 reaches its operative position, angular member 91 has rotated with seat portion 22 relative to said essentially horizontal pivot axis to enable lock pin 90 to enter aperture 93, which helps lock seat portion 22 in its seat portion operative position depicted in FIGS. 5, 6 and 7.

Figure 6:
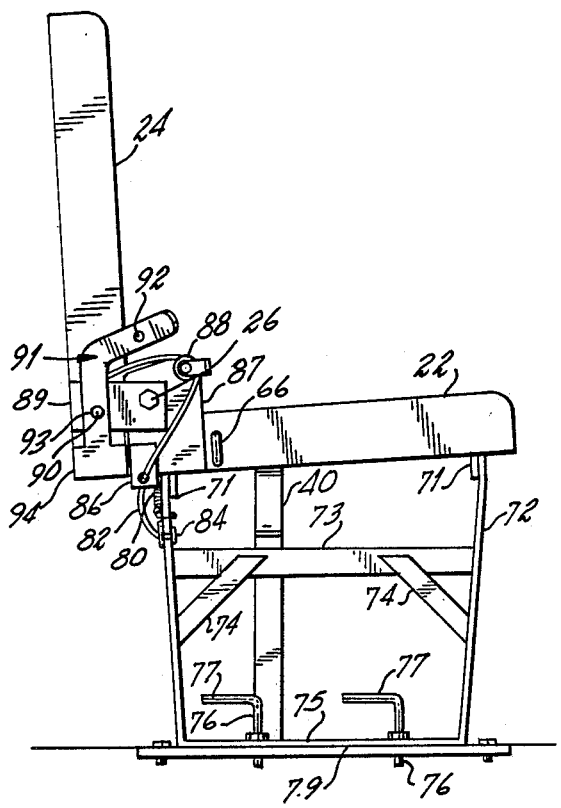
FIG. 6 is an end view of the open, unfolded convertible bench seat of this invention occupying the operative position depicted in FIG. 5.
Figure 7:
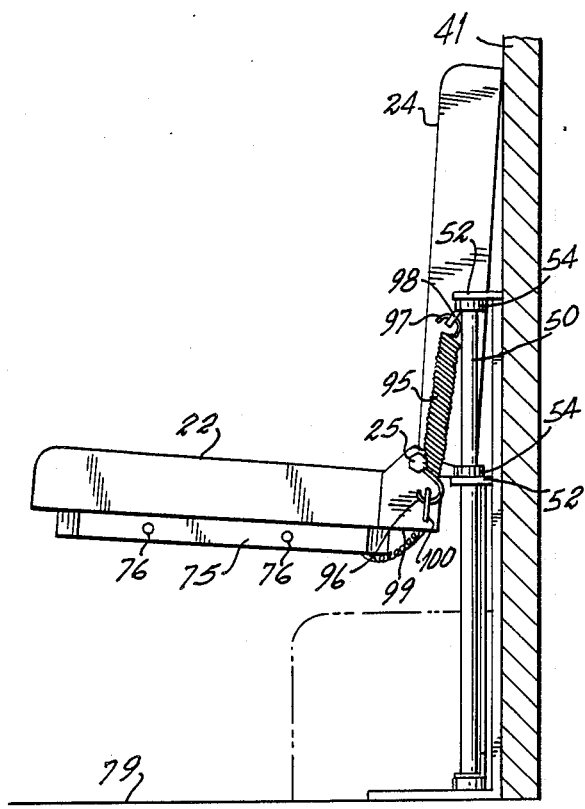
FIG. 7 represents an opposite end view of the unfolded bench of FIG. 6, showing details of a spring lock that prevents a front, or inner end portion (near the wall of a vehicle in the operative position) from sagging beyond its operative seat portion position by having the spring urge the forward pivot hinge for the convertible bench seat into an over center position to prevent excessive lowering of the inner end of the unfolded seat portion against the supporting wall of the vehicle.
Figure 4:
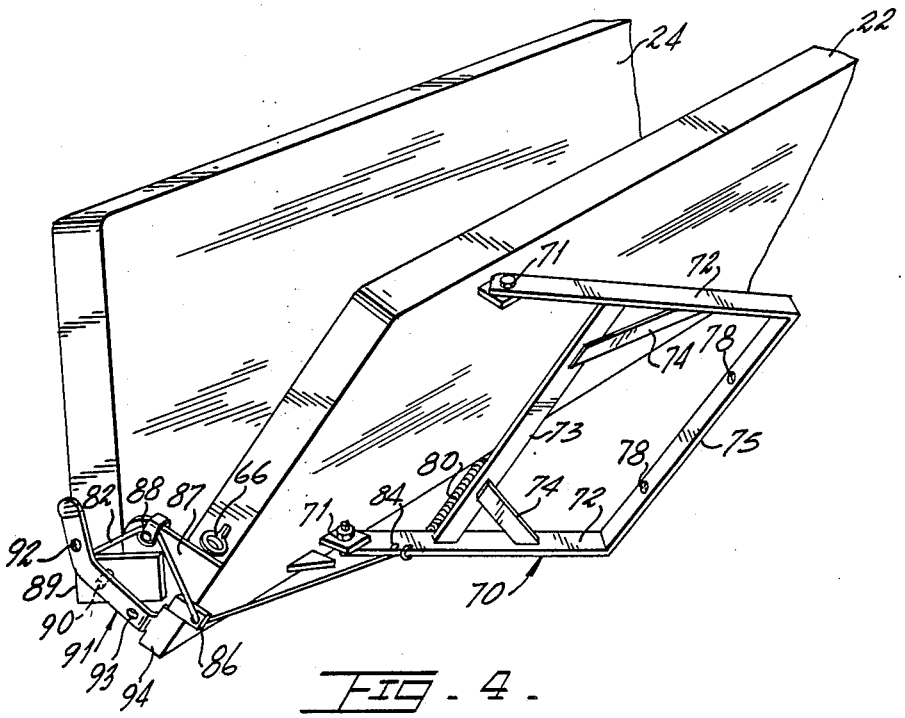
FIG. 4 is a perspective end view of the convertible bench seat of this invention when the seat portion is partly unfolded from the back portion and an apertured, angular end lock member of flexible material is bearing against a lock pin between a first aperture on the angular end lock member that receives the lock pin to lock the seat portion of the convertible bench seat in its seat portion locking position supported against the back portion of the convertible bench seat and a second aperture spaced from said first aperture that receives said lock pin to lock said seat portion in a seat portion operative position.

FIG. 4 depicts the convertible bench seat 20 in an intermediate position halfway between the seat storage position of FIGS. 1 and 2 and the seat operative position of FIGS. 5, 6 and 7. In FIG. 4, lock pin 90 (depicted in phantom) is biased against flexible angular member 91 midway between aperture 92 and aperture 93. Simultaneously, cable 82 has pulled pivotable support frame 70 midway between its seat portion engaging position depicted in FIG. 1 and its completely lowered position depicted in FIG. 6. Spring 80 biases pivotable support frame 70 to prevent the latter from lowering too rapidly in response to the unfolding of seat portion 22 relative to back portion 24.

The apparatus of this invention also comprises a balancing spring 95 (FIG. 7). Balancing spring 95 has a lower hook 96 at one end and an upper hook 97 at its other end. Upper hook 97 engages an upper hook eye 98 fixed to one of the ears 54. A bracket 99 is fixed to seat portion 22 and contains a lower hook eye 100 which receives lower hook 96 of balancing spring 95. The latter prevents the adjacent end of seat portion 22 from sagging relative to the other end of seat portion 22.

In order to provide comfort for a passenger, when seat portion 22 occupies its seat portion operative position, it is sloped at a slight angle downwardly toward the back portion 24. Similarly, back portion is permanently sloped downwardly and inwardly toward its lower end. If the seat portion 22 had its cushion arranged horizontally and back portion 24 had its cushion arranged vertically, the seat in its operating position would not be as comfortable for an occupant as is the case in the illustrated embodiment.

Convertible bench seat 20 may be used as a bed for sleeping purposes. When bench 20 is pivoted to its operative position, seat portion 22 is pivoted forward away from back portion 24 to provide a single bed instead of three seats. Such a single bed may be converted into a double bed by constructing and arranging back portion 24 so that it can be released to pivot rearward and downward into horizontal alignment with seat portion 22. Pivotable support legs (not shown) may be stored within the outline frame of back portion 24 to support back portion 24 in horizontal alignment with seat portion 22 when convertible bench 20 is to be used as a double bed.

It is now evident that this invention provides apparatus that facilitates the conversion of passenger space to cargo space and vice versa in a vehicle without requiring dismantling and/or reassembly of seats to effect such conversion.

According to the provisions of the patent statues, the preferred construction and mode of operation of the present invention has been explained, and what are now considered to be its best embodiments have been illustrated and described. However, it should be understood that the invention may be practiced otherwise than as specifically illustrated and described as limited only by the scope of the claimed subject matter that follows.

What is claimed is:

1. A foldable seat for a vehicle having an essentially vertical wall and an essentially horizontal floor and constructed and arranged for pivoting said foldable seat about a first vertical axis between a seat storage position against said wall and a seat operative position pivoted away from said wall comprising:
    one longitudinal end portion of said seat,
    an opposite longitudinal end portion of said seat,
    a back portion for said foldable seat,
    a seat portion for said foldable seat pivotally connected to said back portion about an essentially horizontal axis for movement between a seat portion storage position against said back portion and a seat portion operative position unfolded from said back portion,
    a first vertical pivot rod adjacent said essentially vertical wall and constructed and arranged for pivotally supporting said one longitudinal end portion of said foldable seat for movement of said foldable seat about said first vertical axis,
    a second vertical pivot rod adjacent said essentially vertical wall in spaced relation to said first vertical pivot rod, and
    a locking mechanism pivotally secured to said second vertical pivot rod and constructed and arranged for selectively securing said foldable seat to said wall and for selectively releasing the opposite longitudinal end portion of said foldable seat to pivot away from said wall about said first vertical pivot rod, further including
    a pivotable support frame pivotably supported at one end thereof to said foldable seat, and
    means operatively connected between said pivotable support frame and said seat portion and constructed and arranged to lower said pivotable support frame to engage the floor of said vehicle when said seat portion moves to said unfolded seat portion operative position and to lift said pivotable support frame into engagement with said seat portion when the latter moves into said folded seat portion storage position.

2. A foldable seat as in claim 1, wherein said locking mechanism comprises:
    a first cooperative locking member having an outer end portion pivotably mounted to said second vertical pivot rod,
    a second cooperative locking member fixed to the opposite longitudinal end portion of said foldable seat for alignment with said first cooperative locking member when said foldable seat occupies its said seat storage position and said seat portion occupies its seat portion storage position, and
    a third cooperative locking member constructed and arranged to secure said second cooperative locking member to said first cooperative locking member when said first and said second cooperative locking members are aligned.

3. A foldable seat as in claim 1, further including frame connecting means constructed and arranged to selectively secure said pivotable support frame to said floor when said pivotable support frame engages said floor of said vehicle when said foldable seat occupies its said seat operative position and said seat portion occupies its said seat portion operative position unfolded from said back portion.

4. A foldable seat as in claim 2, further including frame connecting means constructed and arranged to selectively secure said pivotable support frame to said floor when said pivotable support frame engages said floor of said vehicle when said foldable seat occupies its said seat operative position and said seat portion occupies its said seat portion operative position unfolded from said back portion.

5. A foldable seat as in claim 2, wherein said first cooperative locking member comprises a horizontally extending slotted leg having an elongated slot and said second cooperative locking member comprises an eye bolt extending outward from said opposite longitudinal end portion of said foldable seat, said eye bolt being so constructed and arranged that when said foldable seat is pivoted to said seat storage position and said seat portion is pivoted to said seat portion storage position against said back portion, said eye bolt extends through said elongated slot.

6. A foldable seat as in claim 5, wherein said first cooperative locking member further includes an end flange extending angularly from an inner end portion of said horizontally extending slotted leg opposite said outer end portion of said first cooperative locking member to cooperate with said horizontally extending slotted leg to form a corner constructed and arranged to engage a corner portion of said other longitudinal end portion of said foldable seat when said eye bolt extends through said elongated slot.

7. A foldable seat as in claim 6, further including a locking pin constructed and arranged to extend through an eye of said eye bolt to serve as said third cooperative locking member when said eye bolt extends through said elongated slot.

8. A foldable seat as in claim 7, further including means to tether said pin to said first cooperative locking member to prevent the sliding of said pin through the eye of said eye bolt.

9. A foldable seat as in claim 5, further including a locking pin constructed and arranged to extend through an eye of said eye bolt to serve as said third cooperative locking member when said eye bolt extends through said elongated slot.

10. A foldable seat as in claim 9, further including means to tether said pin to said first cooperative locking member to prevent the sliding of said pin through the eye of said eye bolt.

11. A foldable seat as in claim 4, wherein said operatively connected means comprises a spring interconnecting said pivotable support frame to said seat portion and a flexible cable interconnecting said pivotable support frame to said back portion.

12. A foldable seat as in claim 1, further including a lock pin fixed to one of said back portion and said pivotable seat portion and extending from said portion to which it is fixed,
an angular member of flexible material fixed to the other of said back portion and said pivotable seat portion and having a first aperture therethrough and having a second aperture therethrough spaced from said first aperture, said apertured angular member being constructed and arranged so that one of said apertures receives said lock pin when said seat occupies said seat portion storage position and the other of said apertures receives said lock pin when said seat portion occupies said seat portion operative position.

13. A foldable seat as in claim 12, wherein said angular member of flexible material is composed of spring steel.

* * * * *